Oct. 14, 1924.
H. D. JAMES
1,511,342
MOTOR CONTROL SYSTEM
Original Filed Feb. 20, 1920
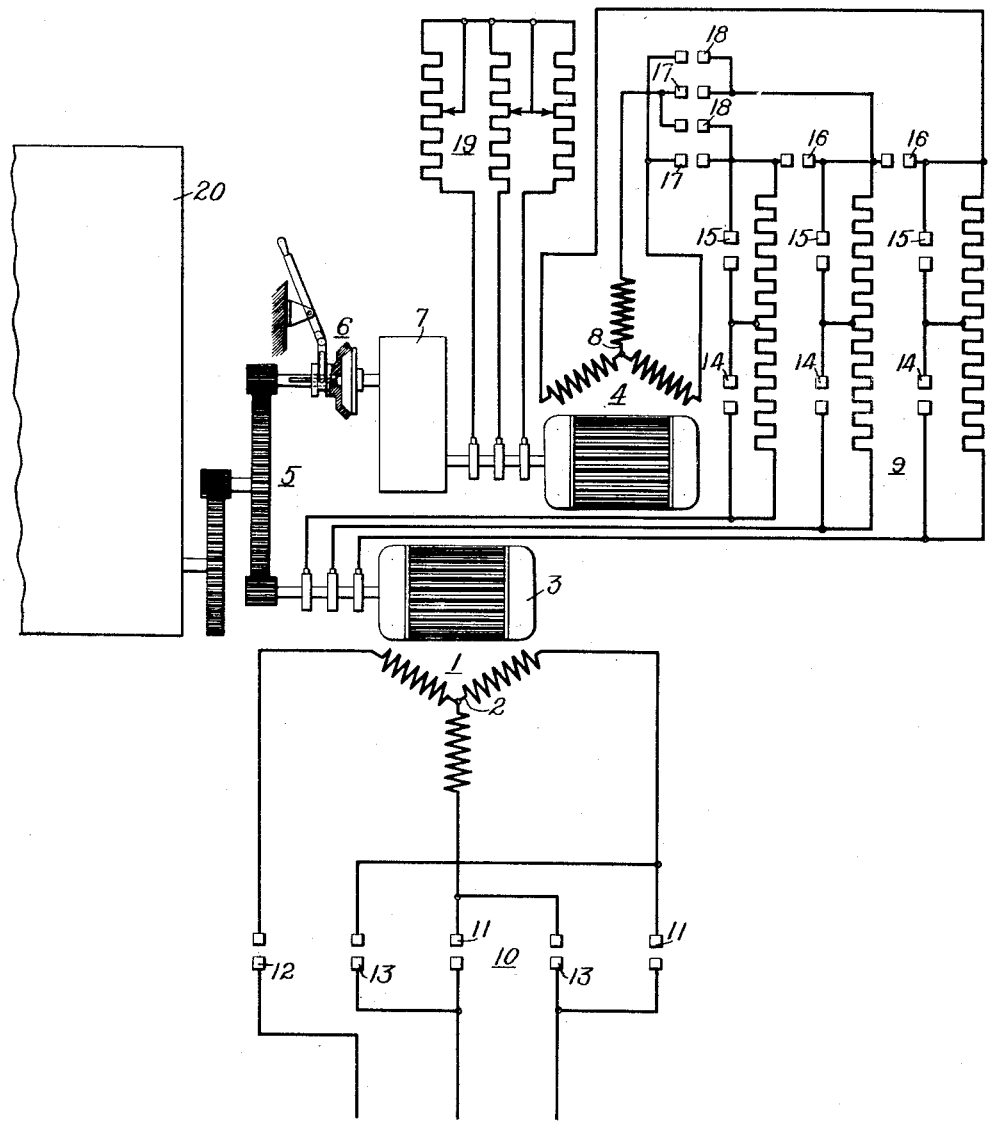
WITNESSES:
J. A. Helsel
Wm. C. McCoy
INVENTOR
Henry D. James.
BY
Wesley G. Carr
ATTORNEY Patented Oct. 14, 1924.

1,511,342

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed February 20, 1920, Serial No. 360,114. Renewed August 8, 1924.

*To all whom it may concern:*

Be it known that I, HENRY D. JAMES, a citizen of the United States, and a resident of Edgewood Park, in the county of Allegheny and State of Pennsylvania, have invented a new and useful Improvement in Motor-Control Systems, of which the following is a specification.

My invention relates to control systems for induction motors and particularly to a simplified system for controlling induction motors connected in cascade relation.

One object of my invention is to provide a simplified system for obtaining speed changes of wide range in induction motors.

Another object of my invention is to provide an improved method for starting induction motors.

My invention consists broadly of a main induction motor that is mechanically connected to an auxiliary motor which receives energy from the rotor winding of the main motor. An adjustable resistor is connected in circuit with the rotor winding of the main motor and the stator winding of the auxiliary motor for further controlling the speed of operation of the main motor. A clutch and a gear-shifting mechanism change the mechanical relation of the motors.

The single figure of the accompanying drawing is a diagrammatic view of a control system embodying my invention.

The control system illustrated in the accompanying drawing embodies a main induction motor 1 having a stator winding 2 and a wound rotor 3 that is mechanically connected to an auxiliary induction motor 4 by means of gears 5, a clutch 6 and gear shifting mechanism 7. The primary winding 8 of the auxiliary induction motor 4 is connected in circuit with the winding of the rotor 3 of the main motor through a resistor 9. The stator winding 2 of the main motor 1 is provided with a line switch 10 having a series of contactors 11, 12 and 13 for connecting the system to a source of energy and for reversing the direction of operation of the motors. Switches 14, 15 and 16 are provided for excluding portions of the resistor 9 from the circuit of the rotor winding 3 and for excluding the auxiliary motor 4 from the circuit of the main motor. Contactors 17 and 18 change the direction of concatenation of the motors. The rotor winding of the auxiliary motor 4 is provided with an adjustable rheostat 19 for further controlling changes of speed in the system.

The clutch 6 is adapted to mechanically connect or disconnect the rotor of the motor 4 from the main motor 1 during the operation of the system. The gear ratio of connection of the two motors may be adjusted by means of the gear-shifting mechanism 7.

One method of operating my system is to close the line switch 10 and thereby energize the main and auxiliary motors. The frequency of the energy supplied to the auxiliary motor will be substantially that of the ratio of transformation in the main motor when the switch 10 is first closed. If it is assumed that the clutch 7 is in position to mechanically connect the rotors of motors 1 and 4, the torque of motor 4 will assist motor 1 in its initial acceleration. Further acceleration of the motor 1 is effected by first closing contactors 16. This action removes motor 4 from the electrical circuit of motor 1 and it may, therefore, be disconnected by operating clutch 6. Acceleration may further be effected by successively closing contactors 14 and 15 to remove resistance from the rotor winding of main motor 1. When switch 16 is in its closed position, the rotor winding of main motor 1 is connected for normal operating speed, and the operation of motor 1 is substantially that of any induction motor operating alone.

Although my system of control is suitable for a wide variety of applications, I have illustrated the system as connected to a device 20 that may be assumed to be the platen of a planer. For this particular application, we may assume that motors 1 and 4 are duplicate motors. Therefore, in accordance with the well known principles of concatenation, the speed of the system, with both motors operating from the single source of energy, will be substantially one half of the speed of one of the motors operating alone.

The operation of the system, as employed for driving the platen of a planer, is substantially as follows. For the cutting stroke, both motors are operated in concatenated relation by closing contactors 11 and 12. For the first step of acceleration for the cutting stroke, contactors 14 and 15 are successively closed. The desired speed of operation for this stroke is adjusted by changing the gear shifting mechanism 7 and by adjusting rheostat 19 in the circuit of the rotor winding of motor 4.

For this class of work, it is desired to return the platen at a materially increased speed of operation. On the return stroke, contactors 11 are opened and contactors 13 are closed to reverse the direction of operation of the system. Switch 16 is simultaneously closed and the steps of acceleration are effected by closing switches 14 and 15 successively. The return stroke is, therefore, effected, at substantially twice the speed of the cutting stroke. The motor 4 is, in this case, driven idle or it may be manually or automatically disconnected by the operation of clutch 6. This completes the cycle of operation for the planer.

If the machine 20 is assumed to be a skip hoist, where a materially different speed of operation is desired, the gear ratio of connection of the two motors may be changed to a value such, for example, as five to one. Assuming that the motors are duplicate eight-pole motors, the auxiliary motor 4, which is geared to the main motor 1 at a ratio of five to one, has an equivalent of five times eight, or forty, poles. The speed of the system, with the two motors in cascade relation, will then be the equivalent of a system operated by an eight plus forty, or forty-eight, pole motor. It will therefore be understood that the speed of the system, when driven by duplicate motors connected in direct concatenated relation with a gear ratio of five to one, will be one sixth the speed of the system driven from the main motor alone. The method of acceleration of the motors will, in this instance, be substantially the same as that employed in the previously assumed drive for a planer.

Another method of operating my system is to close switch 10 in the usual manner after clutch 6 has been actuated to disconnect motor 1 from motor 4. The rotor frequency of motor 1 is then impressed upon the primary winding of motor 4 through the resistor 9, and motor 4 is caused to accelerate substantially as a frequency changer connected in the circuit of the rotor winding of motor 1. Further acceleration of motor 1 is effected by moving clutch 6 to a position for mechanically connecting the motors 1 and 4. From this point, the acceleration of the system is effected by adjusting the rheostat 19 to remove resistance from the secondary winding of the motor 4 and thereby to decrease the slip and increase the speed of motor 4. Contactors 14, 15 and 16 are successively closed in the manner hereinbefore described to bring the motor 1 to normal operating speed. Motors 1 and 4 are now mechanically disconnected by operating clutch 6.

Deceleration of the motor 1 may be effected by opening switches 14, 15 and 16 in the reverse order in which they were closed and thus re-energizing the stator winding of motor 4. The voltage from the winding of rotor 3, will be impressed on the stator winding 8 of motor 4 and, since motor 4 is substantially without auxiliary load, the clutch 6 occupying an open position, the motor 4 will operate as a frequency changer to reduce the equivalent frequency applied to motor 1. Motor 4 will, therefore, accelerate and motor 1 will decelerate. The clutch 6 is then moved to a position for mechanically connecting motors 1 and 4, and line switch 10 is opened to disconnect the system from the source of energy.

If it is desired to obtain a relatively high speed by operating motors 1 and 4 in differential cascade relation, switches 17 may be opened and switches 18 closed to reverse two phases of the stator winding of motor 4 and thereby to connect motors 1 and 4 in differential concatenated relation.

It will be apparent that alterations in the system, as hereinbefore described, may be made, and I desire, therefore, that only such limitations shall be imposed as are indicated in the appended claims.

I claim as my invention:

1. A control system comprising a main induction motor, an auxiliary motor in circuit with said main motor, a resistor included in said circuit, switching means for excluding portions of said resistor from said circuit, and means for detachably connecting said main and said auxiliary motor.

2. A control system comprising a main motor, an auxiliary motor, a resistor in circuit with said main motor and said auxiliary motor, switching means for excluding said auxiliary motor from said circuit, switching means for excluding portions of said resistor from said circuit, and mechanical means comprising a releasable clutch for connecting the rotors of said motors.

3. A control system comprising a main induction motor, an auxiliary motor in circuit with said main motor, a resistor in said circuit, switching means for excluding portions of said resistor from said circuit, means for detachably connecting said main and said auxiliary motor, and means for varying the ratio of gear connection of said motors.

4. A control system comprising a main induction motor having a rotor winding, an auxiliary induction motor having a stator winding and a rotor winding, a resistor in circuit with the rotor winding of said main motor and the stator winding of said auxiliary motor, switching means for rendering portions of said resistor ineffective, switching means for excluding said auxiliary motor from the circuit of said main motor, an adjustable rheostat in circuit with the rotor winding of said auxiliary motor and a clutch mechanism for mechanically connecting said motors.

5. A control system comprising a main induction motor having a rotor winding, an auxiliary induction motor having a stator and a rotor winding, a resistor in circuit with the rotor winding of said main motor and the stator winding of said auxiliary motor, switching means included in the circuit of the rotor winding of said main motor and the stator winding of said auxiliary motor for reversing two phases of the auxiliary motor winding, switching means for rendering portions of said resistor ineffective, switching means for excluding said auxiliary motor from the circuit of said main motor, an adjustable rheostat connected in the rotor winding of said auxiliary motor, a clutch mechanism for mechanically connecting said motors, and a gear-shifting mechanism for mechanically connecting said motors.

In testimony whereof, I have hereunto subscribed my name this 10th day of February, 1920.

HENRY D. JAMES.